United States Patent
Huang

(10) Patent No.: US 6,542,355 B1
(45) Date of Patent: Apr. 1, 2003

(54) WATERPROOF KEYBOARD

(75) Inventor: Yao-Lun Huang, Taipei Hsien (TW)

(73) Assignee: Silitek Corporation, Taipei (TW)

( * ) Notice: Subject to any disclaimer, the term of this patent is extended or adjusted under 35 U.S.C. 154(b) by 160 days.

(21) Appl. No.: 09/672,087

(22) Filed: Sep. 29, 2000

(51) Int. Cl.$^7$ .............................. H05K 5/06; H05K 5/02
(52) U.S. Cl. ..................... 361/680; 361/683; 361/686; 312/223.2
(58) Field of Search ................. 361/679, 680, 361/683, 684, 686; 312/223.1–223.4

(56) References Cited

U.S. PATENT DOCUMENTS

| | | | |
|---|---|---|---|
| 3,959,610 A | * 5/1976 | Finnegan et al. | 200/5 A |
| 4,396,830 A | * 8/1983 | Isozaki et al. | 200/302.2 |
| 4,621,373 A | * 11/1986 | Hodsdon | 200/5 A |
| 4,796,007 A | * 1/1989 | Heys, Jr. | 200/5 A |
| 4,862,499 A | * 8/1989 | Jekot et al. | 200/5 A |
| 5,197,178 A | * 3/1993 | Lichte et al. | 206/305 |
| 5,521,345 A | * 5/1996 | Wulc | 200/310 |
| 5,612,692 A | * 3/1997 | Dugas et al. | 200/5 B |
| 5,734,136 A | * 3/1998 | Newcomer et al. | 200/302.1 |
| 6,054,939 A | * 4/2000 | Wei et al. | 200/513 |
| 6,215,420 B1 | * 4/2001 | Harrison et al. | 200/302.1 |
| 6,239,391 B1 | * 5/2001 | Nishijima et al. | 200/302.2 |

FOREIGN PATENT DOCUMENTS

| | | | | |
|---|---|---|---|---|
| EP | 685954 A2 | * | 12/1995 | H04M/1/02 |
| GB | 2327208 A | * | 1/1999 | B41J/5/10 |
| JP | 8-102235 A | * | 4/1996 | H01H/13/06 |
| JP | 2001-101950 A | * | 4/2002 | H01H/13/06 |
| WO | WO 01/48771 A1 | * | 7/2002 | H01H/13/70 |

* cited by examiner

Primary Examiner—Anatoly Vortman
(74) Attorney, Agent, or Firm—Rosenberg, Klein & Lee

(57) ABSTRACT

Disclosed is a waterproof keyboard comprising a membrane made of waterproof material. Membrane is provided under the circuit unit being sealed to elastomer member by ultrasonic bonding or UV adhesive. Thus forms a space enclosed by elastomer member and membrane so as to seal circuit unit, between elastomer member and membrane.

1 Claim, 4 Drawing Sheets

WATERPROOF KEYBOARD

FIELD OF THE INVENTION

The present invention relates to keyboards and more particularly to a waterproof keyboard with improved characteristics.

BACKGROUND OF THE INVENTION

Conventionally, keyboard is the most important input device of a personal computer (PC). However, a conventional keyboard suffered from a disadvantage. For example, it is not waterproof. As such, keyboard may malfunction due to short circuit of the circuit unit therein if water accidentally enters into keyboard. A number of prior art such as Taiwanese Patent Publication Nos. 194,192, 254,445, and 279,523 disclose waterproof keyboards for eliminating above disadvantage.

Another conventional waterproof keyboard such as Taiwanese Patent Publication No. 236,428 discloses a plurality of tubes and holes provided on upper housing and lower housing respectively wherein water may flow through tubes to store in a reservoir in the lower housing, thereby preventing water from entering into circuit unit of keyboard.

But this is unsatisfactory for the purpose for which the invention is concerned for the following reasons:

1. Complex in construction due to the provision of tubes and holes on keyboard.
2. Costly to manufacture.
3. The waterproof feature is not well. Water still can enter into keyboard.

SUMMARY OF THE INVENTION

It is thus an object of the present invention to provide an improved waterproof keyboard having various advantages such as completely waterproof, easy assembly, and cost effective.

To achieve the above and other objects, the present invention provides a waterproof keyboard wherein a membrane made of waterproof material under the circuit unit is sealed to the edge of elastomer member for sealing circuit unit between elastomer member and membrane.

The above and other objects, features and advantages, of the present invention will become apparent from the following detailed description taken with the accompanying drawings.

DETAILED DESCRIPTION OF THE PREFERRED EMBODIMENTS

Figure 1:
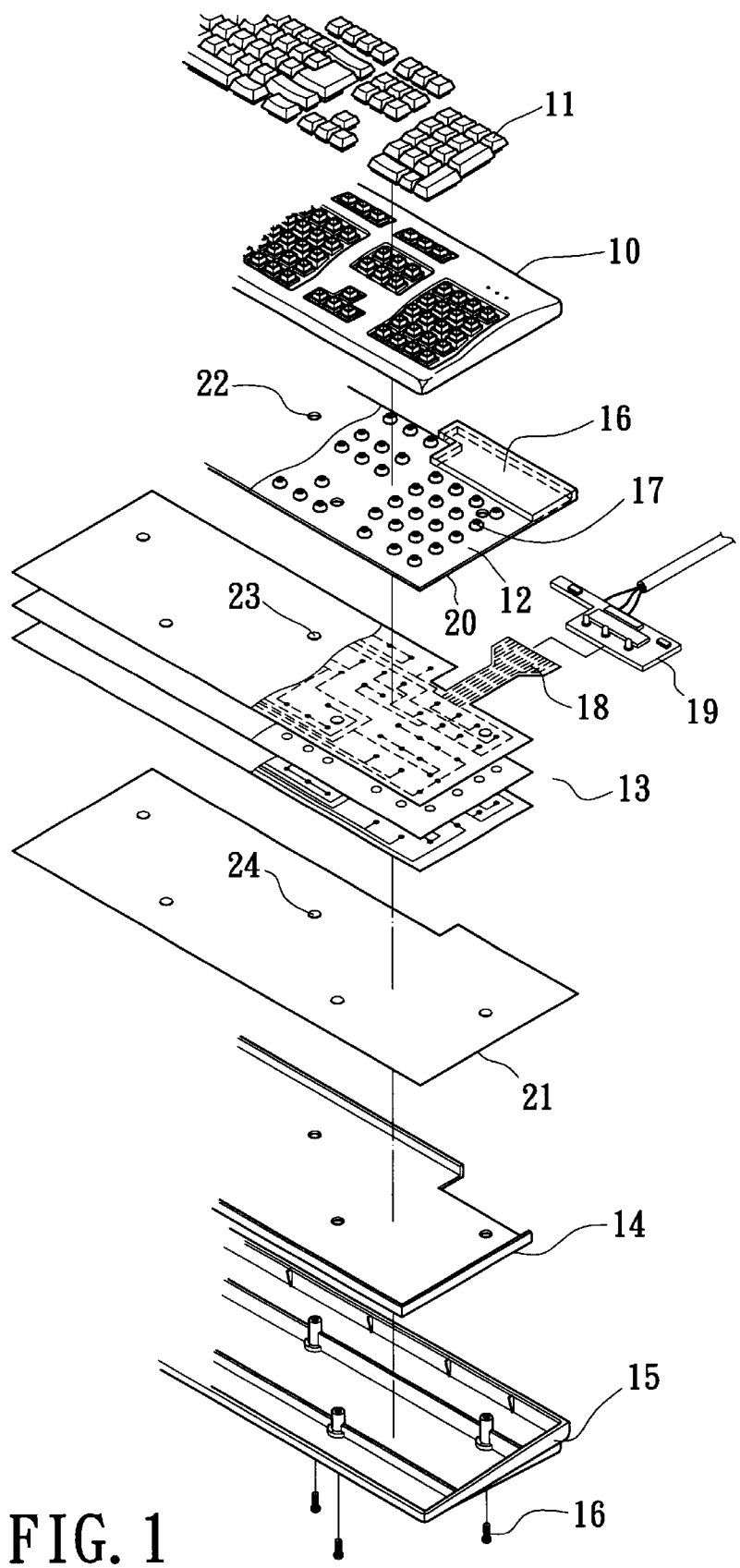
FIG. 1 is an exploded view of a first preferred embodiment of waterproof keyboard according to the invention.
Figure 2:
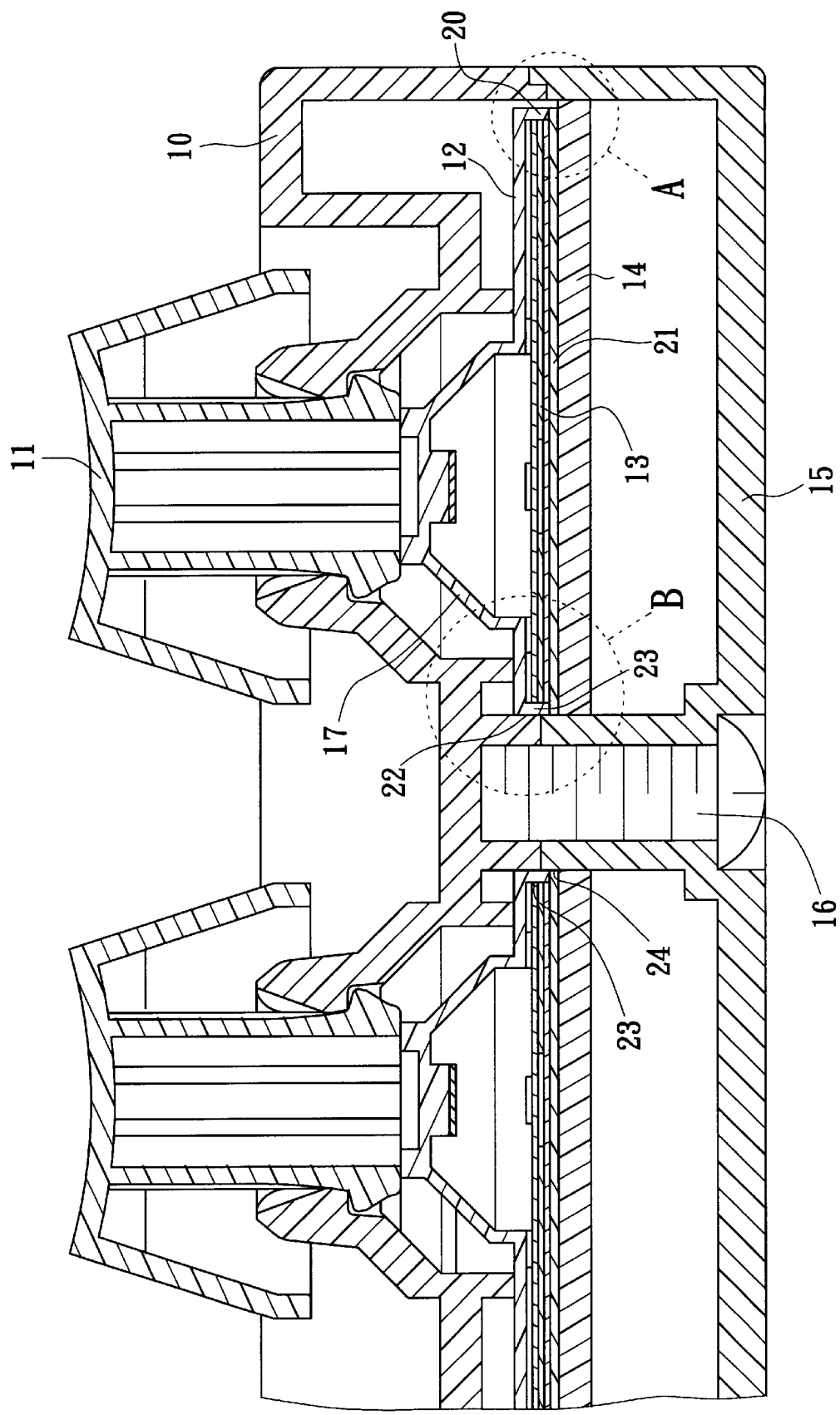
FIG. 2 is a partial sectional view of the FIG. 1 keyboard.

Referring to FIGS. 1 and 2, there is shown a waterproof keyboard constructed in accordance with the invention comprising an upper housing 10, keys 11, an elastomer member 12, a circuit unit 13, a bottom plate 14, a lower housing 15, and a plurality of screws 16 for securing above components together. Elastomer member 12 is provided between keys 11 and circuit unit 13. The upper cap 17 of elastomer member 12 is engaged with key 11. Circuit unit 13 has an extended bus 18 being electrically connected to a PC board 19.

Cap 17 of elastomer member 12 is pressed down by the pressed key 11. Next, circuit unit (membrane circuit board) 13 is pressed by cap 17 to close the keyboard circuit. Key 11 is bounced back to its original position by the nature of elastic cap 17 once key 11 is released. This opens the keyboard circuit. This section is prior art thus a detailed description thereof is omitted herein for the sake of brevity.

Figure 3:
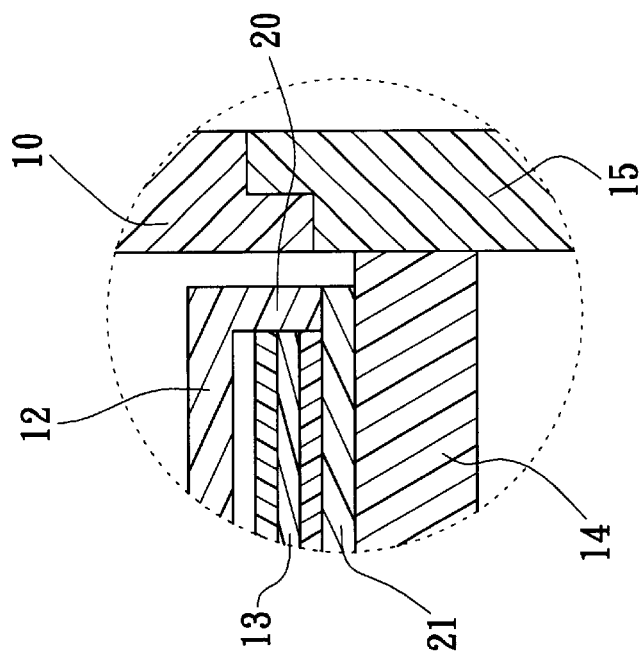
FIG. 3 is a greatly enlarged fragmentary view of circle A shown in FIG. 2.
Figure 4:
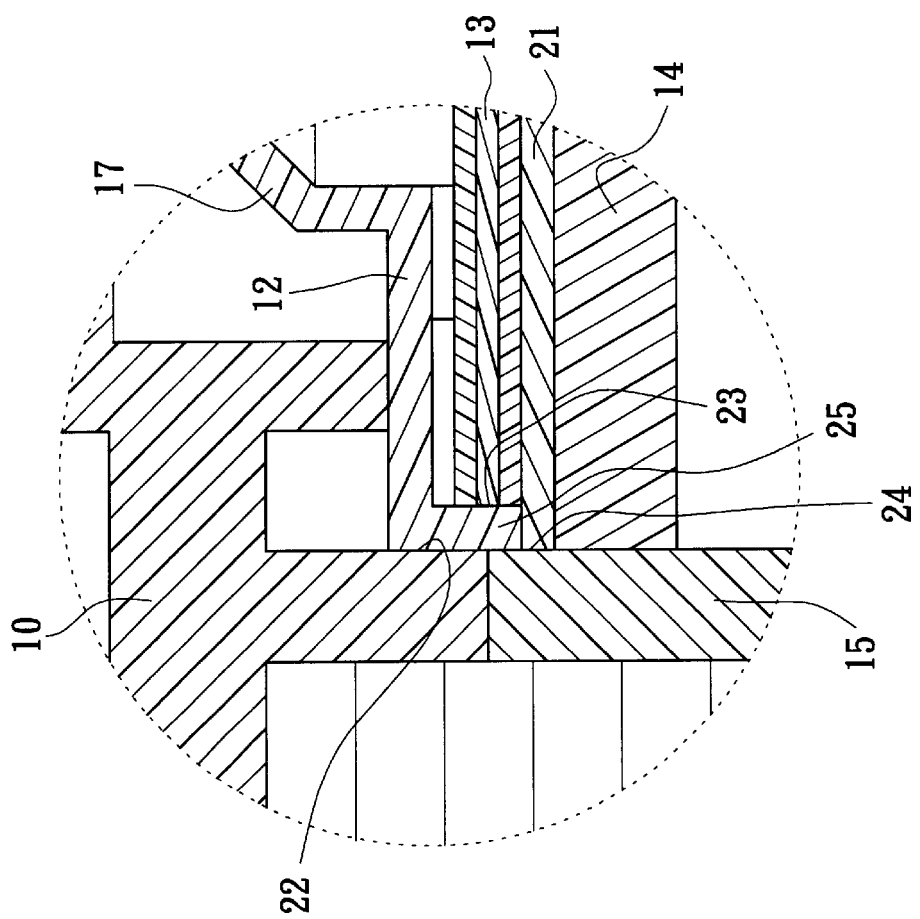
FIG. 4 is a greatly enlarged fragmentary view of circle B shown in FIG. 2.
Figure 5:
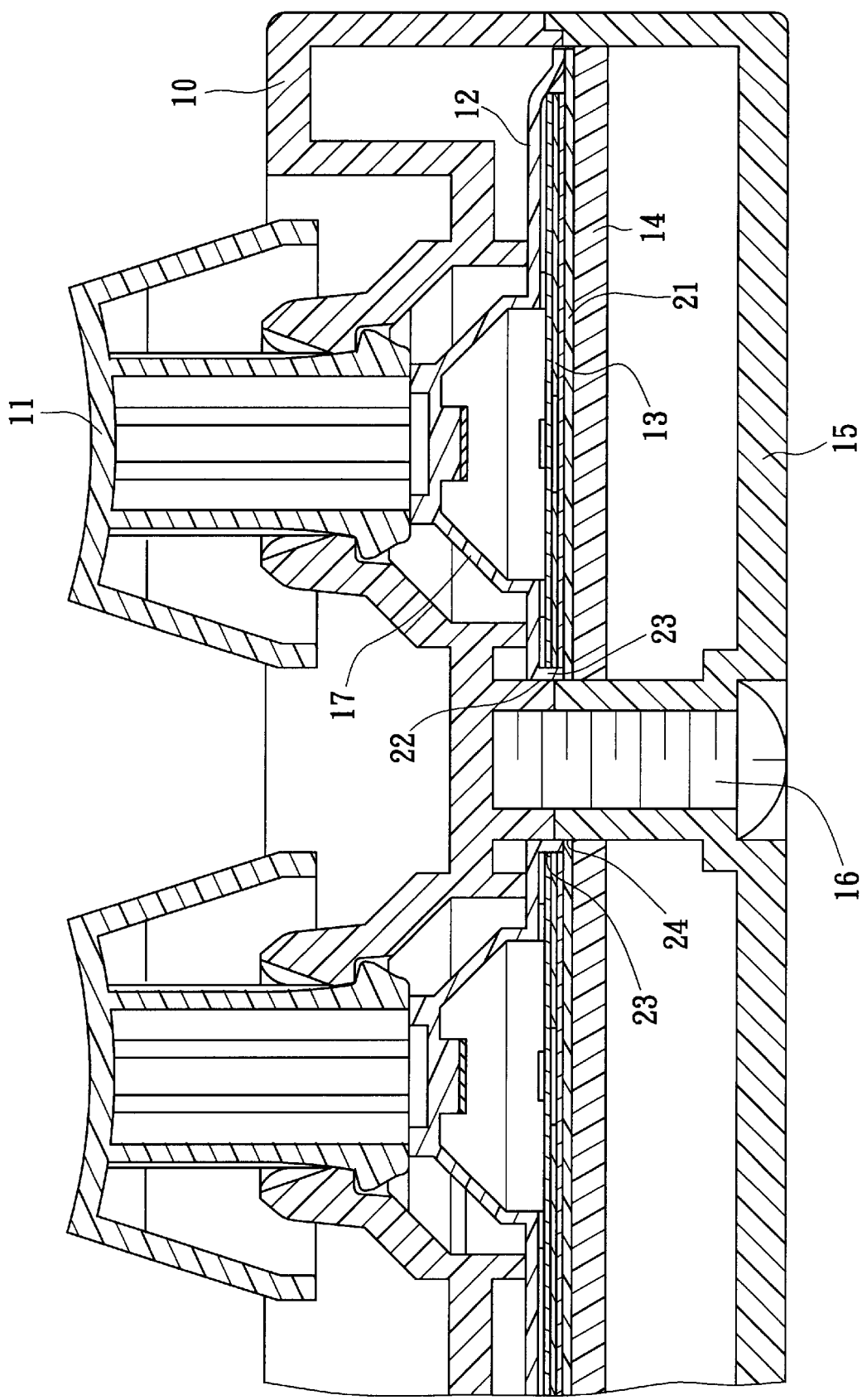
FIG. 5 is an exploded view of a second preferred embodiment of waterproof keyboard according to the invention.

Referring to FIGS. 3 to 5, a frame 20 is formed on the extension of elastomer member 12 (FIG. 3) for receiving circuit unit 13. Frame 20 also positions circuit unit 13 in elastomer member 12. Note that frame 20 may be omitted as shown in second embodiment of FIG. 5. A membrane 21 made of waterproof material is provided under the circuit unit 13. Membrane 21 is shaped to conform with elastomer member 12. As such, membrane 21 may be sealed to the edge of elastomer member 12 by ultrasonic bonding or UV adhesive. This forms a space enclosed by elastomer member 12 and membrane 21 so as to seal circuit unit 13 between elastomer member 12 and membrane 21. Further, a plurality of threaded holes 22, 23, and 24 are provided on elastomer member 12, circuit unit 13, and membrane 21 respectively for screws 16 to drive through. A hollow cylindrical member 25 is extended downward from hole 22 of elastomer member 12 (FIG. 4). The bottom side of hollow cylindrical member 25 is passed through hole 23 of circuit unit 13. Further, membrane 21 maybe sealed to the hollow cylindrical member 25 of elastomer member 12 by ultrasonic bonding or UV adhesive. This can prevent water (or beverage) from entering into the gap between elastomer member 12 and membrane 21 through holes 22, 23, and 24. As a result, circuit unit 13 is sealed between elastomer member 12 and membrane 21.

A receiving space 26 is integrally formed with one side of elastomer member 12. Receiving space 26 is open to the bottom for permitting PC board 19 to receive therein. Also, membrane 21 may be sealed to the bottom, edge of receiving space. 26 by ultrasonic bonding or UV adhesive. This forms a space enclosed by receiving space 26 and membrane 21. As such, PC board 19 is sealed between receiving space 26 of elastomer member 12 and membrane 21. This forms the keyboard of the invention. It is seen that circuit unit 13 and PC board 19 is completely sealed. Thus the keyboard of the invention is totally waterproof.

While the invention has been described by means of specific embodiments, numerous modifications and variations could be made thereto by those skilled in the art without departing from the scope and spirit of the invention set forth in the claims.

What is claimed is:

1. A waterproof keyboard, comprising:
   a base member;
   an upper housing having a set of computer keys mounted thereon, said upper housing being mounted to said base member;

a circuit board having a plurality of switch members mounted thereon, said circuit board having an extended bus;

an elastomeric member having a plurality of elastomeric caps formed thereon, said elastomeric caps engaging respective ones of said set of computer keys;

a waterproof membrane fixedly secured to said elastomeric member, said circuit board being sandwiched between said waterproof membrane and said elastomeric member, said waterproof membrane being secured to said elastomeric member by a waterproof seal, each of said elastomeric caps contacting and selectively closing respective ones of said switch members; and, a PC board electrically connected to said extended bus, said elastomer member including a receiving space having an open bottom for receiving said PC board so as to seal said waterproof membrane to a bottom edge of said receiving space, thereby enclosing said PC board between said receiving space and said waterproof membrane.

* * * * *